May 3, 1960 C. MILLMAN 2,935,330
ROLLER BUMPERS FOR TELESCOPING CARTS
Filed April 27, 1955 2 Sheets-Sheet 2

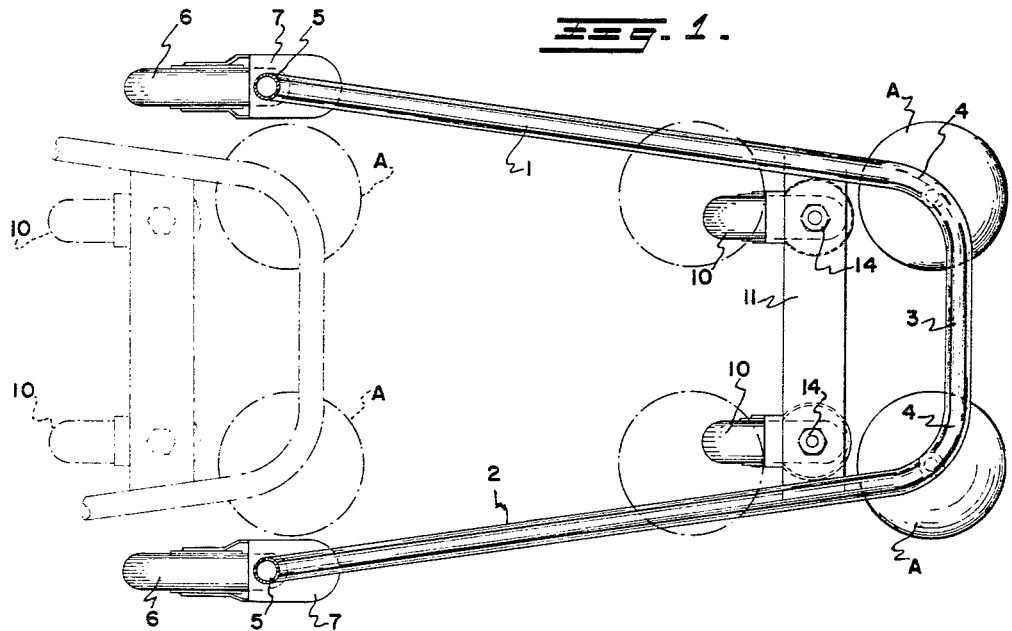
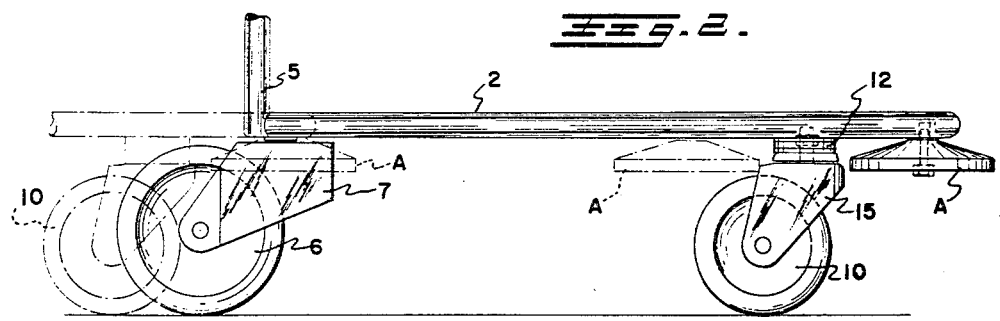

INVENTOR
CLINTON MILLMAN
BY
ATTORNEY

United States Patent Office 2,935,330
Patented May 3, 1960

2,935,330

ROLLER BUMPERS FOR TELESCOPING CARTS

Clinton Millman, Oklahoma City, Okla., assignor to Sylvan N. Goldman, Oklahoma City, Okla.

Application April 27, 1955, Serial No. 504,169

2 Claims. (Cl. 280—33.99)

This invention relates to improvements in telescoping carts of the type used by customers in the handling of goods in self-service stores and contemplates additions to the conventional development of this type which will facilitate the telescoping association of such carts and prevent damage to the parts in general handling and movement of the carts by the customers during use.

Broadly the invention contemplates the provision of roller bumper elements which are so positioned as to act as guides in the telescoping association of two carts and also function as bumpers to protect the individual cart structures from damage due to contact with surfaces during maneuvering and manipulation through the aisles of a store.

A further object of the invention is the provision of a bumper structure for use on telescoping nesting carts which is so constructed and arranged as to facilitate the manipulation or guiding action of the vehicle when moved about among the counters and display tables in a store, the bumpers being mounted for rotary movement to provide a guiding movement of the vehicle on its swiveled roller mountings.

Another feature of the invention is the provision of such rollers of polyethylene or polyvinyl chloride or similar plastic materials, the bumpers being in the form of wheels mounted on nylon spacers or bushings to provide essential lifetime lubrication.

The foregoing objects and other objects such as the removable and replaceable mounting of the bumper rollers will more clearly hereinafter appear by reference to the accompanying drawings forming a part of the instant specification, wherein like characters of reference designate corresponding parts throughout the several views, in which:

Fig. 1 is a top plan view of the chassis of a telescoping cart, illustrating in dotted line the relative position of a similarly constructed associated structure;

Fig. 2 is a side elevation of the disclosure of Fig. 1;

Figure 3:
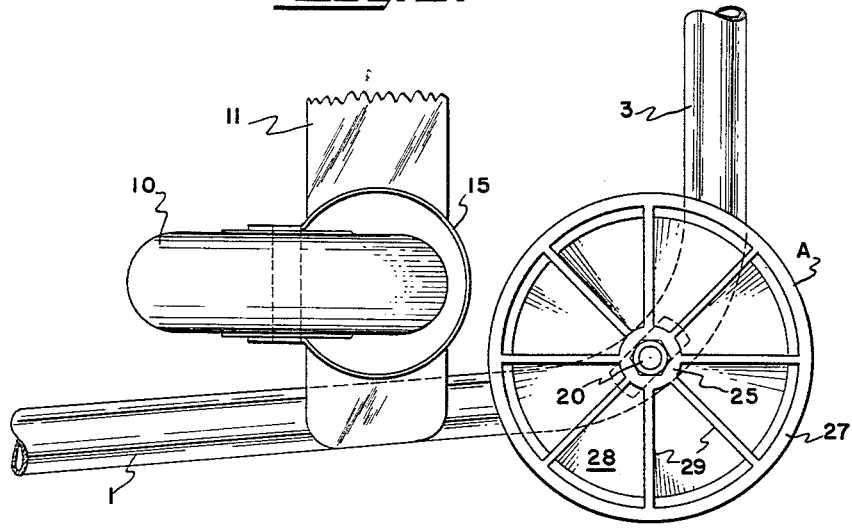
Fig. 3 is a fragmentary bottom plan view showing the invention and caster arrangement.

The chassis or frame of a nesting cart of the type generally shown in Patents No. 2,639,161 and No. 2,662,661 includes forwardly converging side frame members 1 and 2 generally of tubular form and connected at their forward end by cross member 3. This chassis, including the converging side members 1 and 2 and the first connecting member 3, is usually formed as an integral structure with the side frame members connected to the end connecting member 3 by arcuate portions 4. This chassis includes an upright frame structure, parts of which are indicated by reference characters 5. The upper frame structure forms no part of the instant invention, it being obvious to one skilled in the art that the present invention is suitable for use in a telescoping or nesting cart of any general design or configuration of containing any suitable fabrication. As is usual in structures of the present type, the chassis or main frame heretofore defined is supported on rear casters 6 mounted in casings 7, suitably secured to the framing structure generally at approximately the junction of the upright frame 5 and the lower chassis structure. The front of the nesting or telescoping cart is usually provided with spaced casters 10 mounted on transverse supports 11 extending between the side frame members 1 and 2 near the front end of the assembly. The front casters 10 are swivel mounted on the bearings 12 and secured in position by the bolts 14. The swiveled casters 10 are supported from the swiveled bearings 12 by the casing structures 15 and this front swivel mounting permits movement of either, or both, casters upon shifting of the front end of the vehicle in either direction so that the wheels will be aligned to the direction of travel of the vehicle at all times.

It will be noted that the front swivel casters 10 are substantially spaced inwardly of the rear supporting wheels 6, this arrangement being provided to permit the front end of one of the vehicles to nest or telescope within and between the rear wheels of an associated nesting cart.

Figure 4:
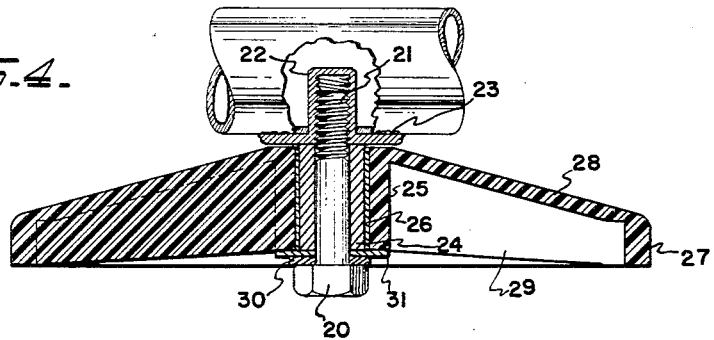
Fig. 4 is a fragmentary sectional view of the invention and its mounting on a portion of the frame structure.

Considerable damage has heretofore been caused to telescoping carts due to rough usage and particularly due to the use of unnecessary force in nesting of such carts, while out of alignment. The present invention provides anti-friction and bumper means for guiding carts into nesting or telescoped association and prevents disfiguring, bending or rupturing of the associated structures both in their movements to telescoped position and in separation of the individual carts from telescoped or nested relation with another cart. To accomplish these objects and to avoid these defects, bumper and guide wheels or rollers are mounted at the forward end of the chassis of each vehicle, these wheels or rollers being indicated by reference character A and shown in detail in Figs. 3 and 4. It will be noted that these bumper or guide wheels A are mounted on bolts hangers 20 depending from the medial portion of the curved frame structure 4 and having their threaded extremities 21 received in T-nuts which are welded at 23 to the wall about the opening in which the T-nuts are received in the tubular frame structure. Spanner bushings 24 are fitted about the shank of the hanger bolts 20 and interposed between the spanner bushings 24 and the openings in the hubs 25 of the bumper wheel are nylon spacer bushings 26. This assembly provides constant lubrication and permits free movement of the bumper guide wheels A. The bumper guide wheels each include the relatively thick rim 27, hubs 25 and conical wheel flange structure 28. A plurality of spokes or webs 29 connect the peripheral annular rim 27 with the hub and are spaced thereabout at suitable intervals as best shown in Fig. 3. A lock washer 30 is used to secure the bolt hangers 20 against turning, this lock washer 30 abutting against the lower face of the spanner bushing 24 and providing area for the washer 31 upon which the bumper guide rollers A are supported for free rotation.

It will be noted by reference to Fig. 2 that the roller bumper wheels abut the casings 15 of the front swiveled wheels of the associated cart thereby limiting the telescoping movement and association between the carts and preventing binding between the chassis frames. It will also be noticed by an inspection of Fig. 1 that the mounting of the roller bumper guide wheels A at the arcuate portions 4 of the chassis frame is such that the outer peripheries of the bumper wheels A pass clearly and freely between the rear mounting wheels or rollers 6 and normally when these bumper wheels A contact an associated frame, as for instance the casing 7, during the telescoping operation as shown in Fig. 1, these roller bumpers will guide the frame to prevent frictional engagement of associated frames and permit movement of one cart within the other. It will also be obvious that the bumper rollers project freely both forwardly and laterally of the chassis frame and will readily engage counters, walls and adjacent articles or elements to prevent jamming of the cart and due to the free revolving of the bumper rollers contact with an upright wall will result in a guiding of the cart in the general direction of its path of movement and tend to turn the cart and its swivel mountings thus rendering handling of a cart by a customer more satisfactory and convenient and relieve the customer of considerable burden in the handling operation.

The construction of the roller bumper guide elements from polyethylene or polyvinyl chloride or similar materials provides a sound-deadening cushioning effect while the use of the nylon anti-friction element provides for free rotation of the roller bumper elements without the necessity of additional lubrication.

What I claim is:

1. In a telescoping cart having a main horizontal frame assembly including forwardly converging side frame members adapted for telescopic association with a frame assembly of a similarly constructed cart, said frame members having a pair of spaced front casters depending therefrom and a pair of rear casters at the rear ends of the converging frame member, said casters being partially supported in casings, rotatable bumper members carried by and depending from the forward part of the said side frame members, said bumper members having their peripheral portions extending laterally of the frame members a sufficient distance to engage the casings of the rear wheels of an associated assembly to guide the telescoping movement of the associated cart and extending forwardly of the frame sufficiently to engage the casings of the front casters of an associated frame assembly to prevent frictional contact between the frames when they assume their fully telescoped position.

2. The structure of claim 1 characterized in that the rotatable bumper members are carried by the forward part of the side frame and project laterally and forwardly of the frame and with their axes so positioned that the peripheral margins of the bumpers are spaced inwardly of the free end portions of the converging side frames.

References Cited in the file of this patent
UNITED STATES PATENTS

| | | |
|---|---|---|
| 1,256,086 | Whidden | Feb. 12, 1918 |
| 1,832,770 | Hallowell | Nov. 17, 1931 |
| 1,888,726 | Arvis et al. | Nov. 22, 1932 |
| 2,479,530 | Watson | Aug. 16, 1949 |
| 2,605,116 | Alexander | July 29, 1952 |
| 2,639,161 | Goldman | May 19, 1953 |
| 2,666,677 | Miller | Jan. 19, 1954 |
| 2,704,234 | Love et al. | Mar. 15, 1955 |